United States Patent
Cordova et al.

(10) Patent No.: US 10,067,157 B2
(45) Date of Patent: Sep. 4, 2018

(54) METHODS AND SYSTEMS FOR SENSOR-BASED VEHICLE ACCELERATION DETERMINATION

(71) Applicant: TRUEMOTION, INC., Boston, MA (US)

(72) Inventors: Brad Cordova, Cambridge, MA (US); Sanujit Sahoo, Cambridge, MA (US)

(73) Assignee: TRUEMOTION, INC., Boston, MA (US)

( * ) Notice: Subject to any disclaimer, the term of this patent is extended or adjusted under 35 U.S.C. 154(b) by 186 days.

(21) Appl. No.: 15/149,603

(22) Filed: May 9, 2016

(65) Prior Publication Data
US 2016/0325756 A1    Nov. 10, 2016

Related U.S. Application Data

(60) Provisional application No. 62/158,301, filed on May 7, 2015.

(51) Int. Cl.
| | | |
|---|---|---|
| G01P 15/00 | (2006.01) | |
| G01P 21/00 | (2006.01) | |
| G01C 21/16 | (2006.01) | |
| G01S 19/14 | (2010.01) | |

(52) U.S. Cl.
CPC .............. *G01P 21/00* (2013.01); *G01C 21/16* (2013.01); *G01S 19/14* (2013.01); *H04M 2250/12* (2013.01)

(58) Field of Classification Search
CPC ....... H04W 4/027; H04W 4/028; H04W 4/04; H04W 4/046; G01C 21/16
See application file for complete search history.

(56) References Cited

U.S. PATENT DOCUMENTS

| | | | | |
|---|---|---|---|---|
| 6,965,397 | B1 * | 11/2005 | Honey | H04N 5/222 33/318 |
| 7,376,507 | B1 * | 5/2008 | Daily | G01C 21/00 340/988 |
| 8,825,274 | B2 | 9/2014 | De Tommasi | |
| 9,253,603 | B1 | 2/2016 | Dong et al. | |
| 9,360,323 | B2 | 6/2016 | Grokop | |
| 9,849,361 | B2 * | 12/2017 | Coza | A63B 69/002 |
| 2012/0173195 | A1 | 7/2012 | Opshaug et al. | |
| 2013/0081442 | A1 | 4/2013 | Basir et al. | |
| 2013/0110450 | A1 | 5/2013 | Kulik | |
| 2014/0149145 | A1 | 5/2014 | Peng et al. | |
| 2014/0278206 | A1 | 9/2014 | Girod et al. | |
| 2015/0088419 | A1 | 3/2015 | Bhardwaj et al. | |
| 2015/0369836 | A1 | 12/2015 | Cordova et al. | |

OTHER PUBLICATIONS

U.S. Appl. No. 14/749,232, "Final Office Action", filed Dec. 7, 2017, 11 pages.
U.S. Appl. No. 14/749,232, "Non-Final Office Action", filed Jun. 30, 2017, 13 pages.

* cited by examiner

Primary Examiner — Elias Desta
(74) Attorney, Agent, or Firm — Kilpatrick Townsend & Stockton LLP

(57) ABSTRACT

Methods and systems are provided that enable accurate driving behavior data (e.g., vehicle acceleration data) to be obtained by a mobile device, despite the reference frames of the mobile device and the vehicle occasionally moving relative to each other. Accordingly, a user does not have to maintain a mobile device stationary relative to a vehicle in order to have a high likelihood that accurate driving data is collected.

18 Claims, 14 Drawing Sheets

300

| | | |
|---|---|---|
| $q_t$ | : | Current quaternion state |
| $q_{t-1}$ | : | Previous quaternion state |
| $\Delta t$ | : | Time step |
| $\Omega(w)$ | : | Angular velocity matrix |
| $Q_{t-1}$ | : | Process noise covariance |
| $K_t$ | : | Kalman matrix |
| $\tilde{P}_t$ | : | A priori error covariance |
| $P_t$ | : | Error covariance |
| $A$ | : | State time evolution matrix |
| $R$ | : | Direction cosine matrix |
| $\tilde{g}$ | : | Gravity vector |
| $I$ | : | 4 x 4 identity matrix |
| $\tilde{a}$ | : | Acceleration vector (from accelerometer) |
| $w$ | : | Rotation rate vector (from gyroscope) |

*FIG. 3A*

METHODS AND SYSTEMS FOR SENSOR-BASED VEHICLE ACCELERATION DETERMINATION

CROSS-REFERENCES TO RELATED APPLICATIONS

This application claims priority to U.S. Provisional Patent Application No. 62/158,301, filed on May 7, 2015, entitled "Methods and Systems for Determining Vehicle Acceleration Information," the disclosure of which is hereby incorporated by reference in its entirety for all purposes.

BACKGROUND OF THE INVENTION

Mobile devices, including smart phones, have been utilized to provide location information to users. Mobile devices can use a number of different techniques to produce location data. One example is the use of Global Positioning System (GPS) chipsets, which are now widely available, to produce location information for a mobile device.

Despite the progress made in relation to collecting data related to drivers and their driving behavior using mobile devices, there is a need in the art for improved methods and systems related to tracking driving behavior using a mobile device.

SUMMARY OF THE INVENTION

Embodiments of the present invention relate to transportation systems. More particularly, embodiments relate to methods and systems for using a mobile device to obtain information related to vehicle acceleration.

Numerous benefits are achieved by way of the present invention over conventional techniques. For example, embodiments of the present invention provide an accurate method of building a risk profile for a driver using driving behavior data collected using a mobile device. By utilizing embodiments of the present invention, methods and systems are provided that enable accurate driving behavior data to be obtained by a mobile device, despite the reference frames of the mobile device and the vehicle occasionally moving relative to each other. Accordingly, a user does not have to maintain a mobile device stationary relative to a vehicle in order to have a high likelihood that accurate driving data is collected. Additional disclosure regarding determining modes of transportation (e.g., driving) so that accurate driving data may be collected can be found in U.S. patent application Ser. No. 15/149,613, filed May 9, 2016, and U.S. patent application Ser. No. 15/149,628, filed May 9, 2016, herein incorporated by reference in their entireties.

Another benefit achieved by way of the present invention over conventional techniques involves the improvement of data collection by sensors on a mobile device (e.g., driving and other similar movement data). One improvement that can be achieved by some embodiments is reduction of power utilized to collect movement data, relative to other approaches conventionally used to collect similar data. For example, typical Global Positioning System (GPS) receivers on a mobile device can be used to collect driving behavior data. GPS receivers however tend to use much more power while operating than other mobile device sensors (e.g., gyroscope, accelerometer) and thus are less than ideal to use where high battery performance is a goal. By enabling techniques that enable lower power mobile sensors to collect accurate movement data, embodiments can provide similar or better driving behavior data as compared to using a GPS receiver, but at a fraction of the energy usage.

According to one embodiment of the invention, a method is provided. The method comprises obtaining a plurality of movement measurements over a plurality of time periods from a mobile device in a vehicle, extracting a first subset of movement measurements from the plurality of movement measurements corresponding to a first time period of the plurality of time periods, and determining a first gravity vector associated with the first time period using at least two movement measurements of the first subset of movement measurements. The method further comprises extracting a second subset of movement measurements from the plurality of movement measurements corresponding to a second time period of the plurality of time periods, and determining a second gravity vector associated with the second time period using at least two movement measurements of the second subset of movement measurements. The method further comprises determining a gravity angle difference or a gravity magnitude difference between the first gravity vector and the second gravity vector, determining that the gravity angle difference is above a first threshold or that the gravity magnitude different is above a second threshold, and classifying the first subset of movement measurements and the second subset of movement measurements as movements of the mobile device with respect to the vehicle. The method further comprises removing the first subset of movement measurements for the first time period and the second subset of movement measurements for the second time period from the plurality of movement measurements to produce remaining movement measurements over remaining time periods, and determining at least one acceleration measurement for the vehicle using the remaining movement measurements over the remaining time periods.

According to one embodiment of the invention, a system is provided. The system comprises a mobile device comprising a plurality of sensors including an accelerometer, a memory, and a processor coupled to the memory, wherein the processor is configured to perform operations including those recited in the methods described herein.

These and other embodiments of the invention along with many of its advantages and features are described in more detail in conjunction with the text below and attached figures.

BRIEF DESCRIPTION OF THE DRAWINGS

FIGS. 3A-3E are a simplified flowchart illustrating a method of determining a gravity vector using movement data according to an embodiment of the present invention.

Figure 1:
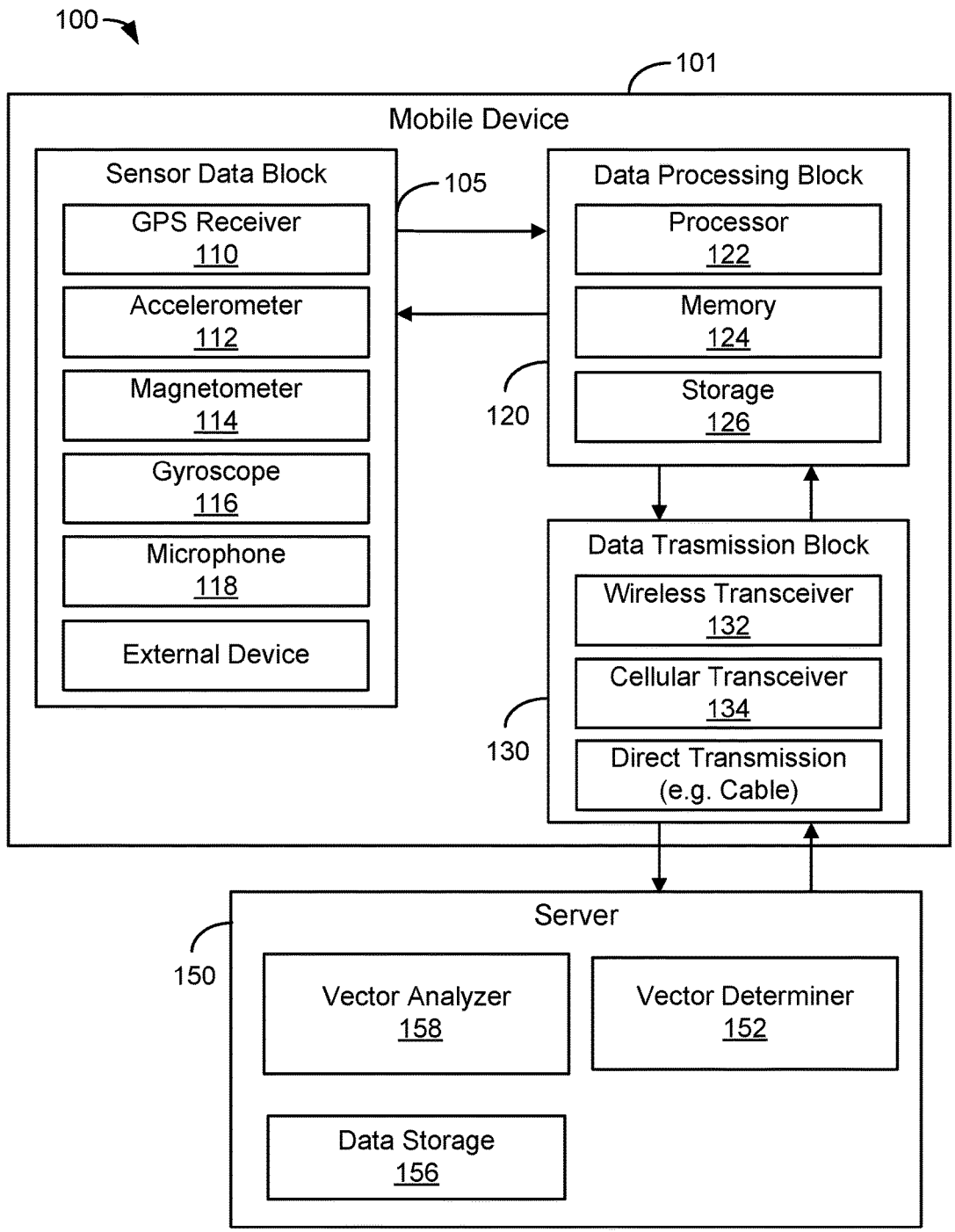
FIG. 1 is a simplified system diagram illustrating a system for collecting driving data according to an embodiment of the present invention.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF SPECIFIC EMBODIMENTS

Embodiments of the present invention utilize mobile devices to provide information on a user's behaviors during transportation. For example, a mobile device carried by a user could be used to analyze driving habits. As would be appreciated by one having skill in the relevant art(s), given the description herein, a mobile device can be configured to measure driving behaviors using sensors such as the GPS receiver, accelerometer, and gyroscope. While the device remains stable in a moving vehicle, these sensors can collect data that reliably represents vehicle movement. When a mobile device is moved in the vehicle as data is being collected, the sensors may collect data that is not representative of vehicle movement. It would be helpful to improve accuracy by minimizing the effects of this additional movement without user (e.g., driver) involvement. One approach to doing this, described herein, involves collecting movement data from the mobile device sensors, reviewing the data, and identifying the portions of the collected sensor data where the mobile device was moving inside the vehicle. These identified portions can be removed or otherwise modified to mitigate their contribution.

As an example, if a person carries a mobile device with them and enters a vehicle as a driver, some embodiments described herein can collect accelerometer, GPS and gyroscope data to measure their driving behavior as they drive. In this example, for the first part of the drive, the mobile device remains in a bag, and later in the drive, the mobile device is moved to a mount on the dashboard, where it remains until the end of the drive. By analyzing the data collected by the mobile device, some embodiments can remove the portion of the data collected while the mobile device was moving from the bag to the dashboard. This removal can act to improve the accuracy of the measured acceleration information. The data collected during the trip (e.g., the measured acceleration information) can be utilized to perform driver identification, score the driver's behavior during the trip, or the like. Additional description related to performing driver identification and scoring of driver's behavior is provided in U.S. patent application Ser. No. 14/139,510, filed on Dec. 23, 2013; U.S. patent application Ser. No. 14/192,452, filed Feb. 27, 2014, now U.S. Pat. No. 8,862,486; U.S. patent application Ser. No. 14/477,519, filed Sep. 4, 2014; U.S. Provisional Patent Application No. 62/286,218, filed Jan. 22, 2016; U.S. Provisional Patent Application No. 62/320,226, filed Apr. 8, 2016; and U.S. Provisional Patent Application No. 62/210,710, filed Aug. 27, 2015; the disclosures of which are hereby incorporated by reference in their entireties for all purposes.

FIG. 1 is a simplified system diagram illustrating a system 100 for collecting driving data according to an embodiment of the present invention. System 100 includes a mobile device 101 having a number of different components. Mobile device 101 includes a sensor data block 105, a data processing block 120, and a data transmission block 130. The sensor data block 105 includes data collection sensors as well as data collected from these sensors that are available to mobile device 101, this can include external devices connected via Bluetooth, USB cable, etc. The data processing block 120 includes storage 126, and manipulations done to the data obtained from the sensor data block 105, this includes, but is not limited to, subsampling, filtering, reformatting, etc. Data transmission block 130 includes any transmission of the data off the mobile device to an external computing device that can also store and manipulate the data obtained from sensor data block 105.

Embodiments of the present invention discuss a system for collecting driving data using a mobile device, and embodiments of the present invention are not limited to any particular mobile device. As examples, a variety of mobile devices including sensors such as accelerometers 112, gyroscopes 116, location determination systems such as GPS receiver 110, communications capabilities, and the like are included within the scope of the invention. Example mobile devices include mobile phones, smart watches, fitness monitors, Bluetooth headsets, tablets, laptop computers, movement analysis devices, and other suitable devices. One of ordinary skill in the art would recognize many variations, modifications, and alternatives.

The system for collecting driving data also can include a server 150 that communicates with the mobile device 101. The server 150 provides functionality including vector analyzer 158, and vector determiner 158, discussed with reference to FIGS. 2-3 below. These components are executed by processors (not shown) in conjunction with memory (not shown). Server 150 also includes data storage 156. It is important to note that, while not shown, one or more of the components shown operating using server 150 can operate additionally or alternatively using mobile device 150.

To collect data associated with the driving behavior of a driver, one or more sensors on mobile device 101 (e.g., the sensors of sensor data block 105) are operated close in time to a period when mobile device 101 is with the driver when operating a vehicle—also termed herein "a drive." With many mobile devices 101, the sensors used to collect data are components of the mobile device 101, and use power resources available to mobile device 101 components, e.g., mobile device battery power and/or a data source external to mobile device 101.

Figure 2:
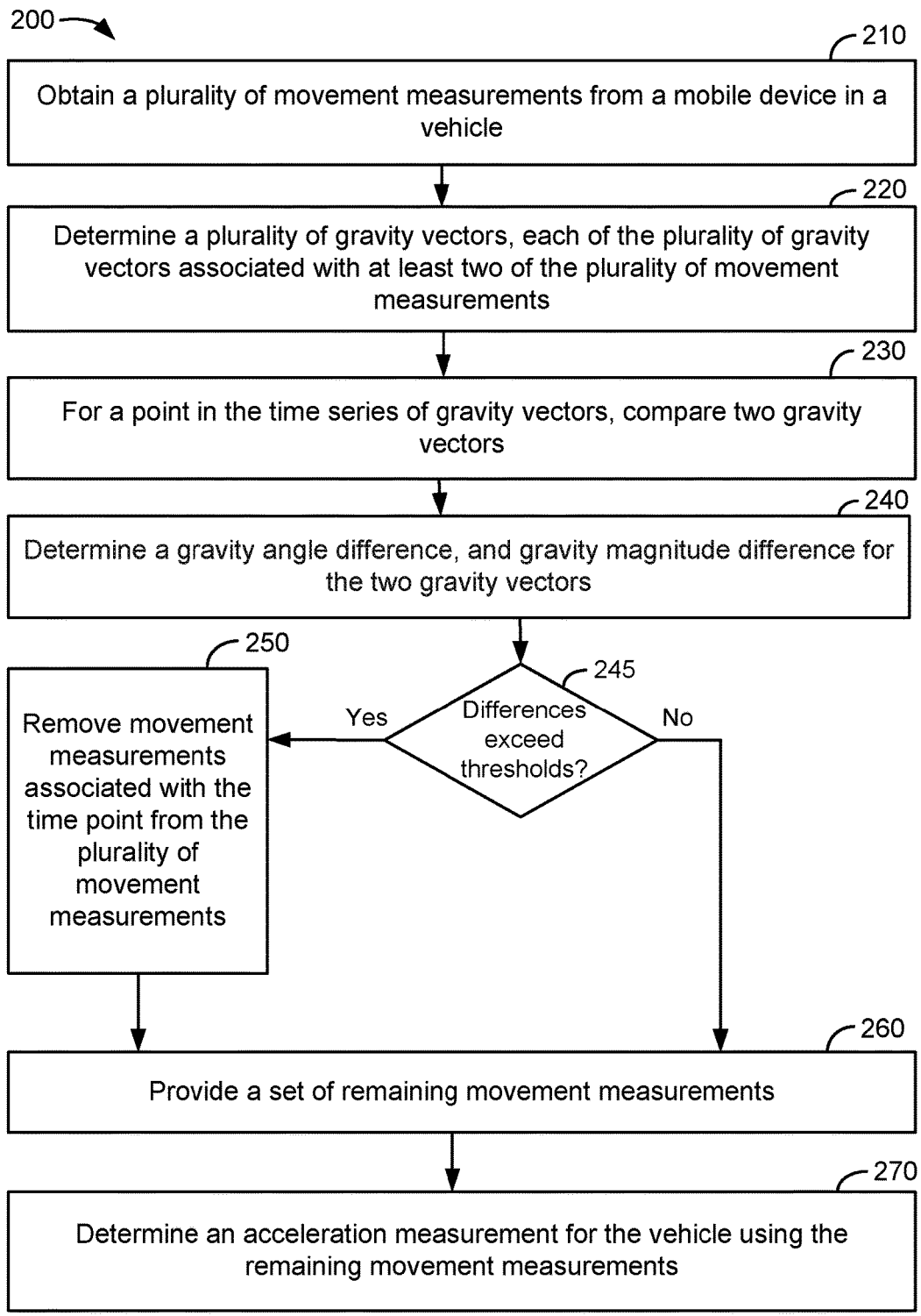
FIG. 2 is a simplified flowchart illustrating a method of collecting driving data using a driving model according to an embodiment of the present invention.

FIG. 2 is a simplified flowchart illustrating a method of collecting driving data using a driving model according to an embodiment of the present invention. The method illustrated in FIG. 2 initially collects data from mobile device sensors in a mobile device while a vehicle engages in a drive. The method includes obtaining a plurality of movement measurements from a mobile device in a vehicle (210).

The movement measurements can be obtained, for example, using sensor data block 105 in mobile device 101, e.g., a smart phone or other suitable mobile device. The collected data can include location data (e.g., GPS receiver 110 data) as a function of time, accelerometer 112 data, gyroscope 116 data, combinations thereof, or the like. In some embodiments, in order to prolong battery life, only location/GPS data or accelerometer data is utilized, whereas in other embodiments, the location data is supplemented with accelerometer data. One of ordinary skill in the relevant art(s) would recognize many variations, modifications, and alternatives.

Once movement measurements are collected, the method determines a plurality of gravity vectors, each of the plurality of gravity vectors associated with at least two of the plurality of movement measurements (212). The more movement measurements of the plurality of movement measurements that are used to determine a gravity vector, the more accurate the gravity vector will be. Referring back to FIG. 1, these gravity vectors can be created by vector determiner 152 of server 150 using the collected movement measurements.

In some embodiments, a gravity vector is determined based on a comparison of one or more movement measurements from the accelerometer of the mobile device with one or more movement measurements from the gyroscope 116 of the mobile device. Gyroscope 116 can generate a data set that measures angular velocity of the mobile device, and this can provide data associated with how the mobile device is being rotated.

Accelerometer 112 can generate a data set that measures the external forces that are being applied on the mobile device (also termed "accelerations"), but the acceleration measured is a center of mass acceleration, because the sensor does not generally measure any rotations of the mobile device. As would be appreciated by one having skill in the relevant art(s), given the description herein, by using these two data sets, a gravity vector relative to the mobile device as a function of time G(t) can be determined 220. Different approaches used by embodiments for determining a gravity vector based on sensor data are discussed below with FIGS. 3A-3E.

Generally speaking, in a moving vehicle, the determined gravity vector of the mobile device as a function of time is always changing. Some embodiments continue by analyzing two gravity vectors associated with a time point (t), for example, gravity vectors G(t) before and after the time point (e.g., at t−15 seconds and t+15 seconds). By comparing these gravity vectors over a time interval, a difference in gravity angle (e.g., measured in radians), and a difference in gravity magnitude can be determined 240 (respectively termed herein, gravity angle difference and gravity magnitude difference). It should be appreciated that a larger or smaller interval can also be used. It is also important to note that, while embodiments described herein are described as operating on stored data (i.e., after the drive has completed, not in real time), the components, principles and approaches described herein could also operate in substantially real-time (e.g., using a t−30 and t−15 interval for example to analyze gravity vectors, or other suitable approach).

In some embodiments, whether the mobile device remained stationary within the vehicle during a time interval can be estimated by comparing the determined gravity angle difference, and/or the determined gravity magnitude difference to one or more thresholds (245). In an example of this threshold comparison, having a gravity angle difference above one (1) radian and/or a gravity magnitude difference above one (1) g indicate in an embodiment that the mobile device likely moved relative to the vehicle at time point (t). It would be appreciated by one having skill in the relevant art(s), given the description herein, that different combinations of threshold values could be used, e.g., different gravity magnitude differences, different gravity angle differences, and/or requiring multiple consecutive differences over thresholds before a change in orientation is estimated. In one embodiment, the threshold values are established from previously obtained data associated with known mobile device movement measurements within a vehicle.

In some embodiments, when the applied threshold(s) are exceeded for a time point, the movement measurements associated with the time point are removed from the plurality of movement measurements (260), and an acceleration measurement for the vehicle is determined using the remaining movement measurements.

It should be appreciated that the specific steps illustrated in FIG. 2 provide a particular method of collecting driving data using a driving model according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3B:
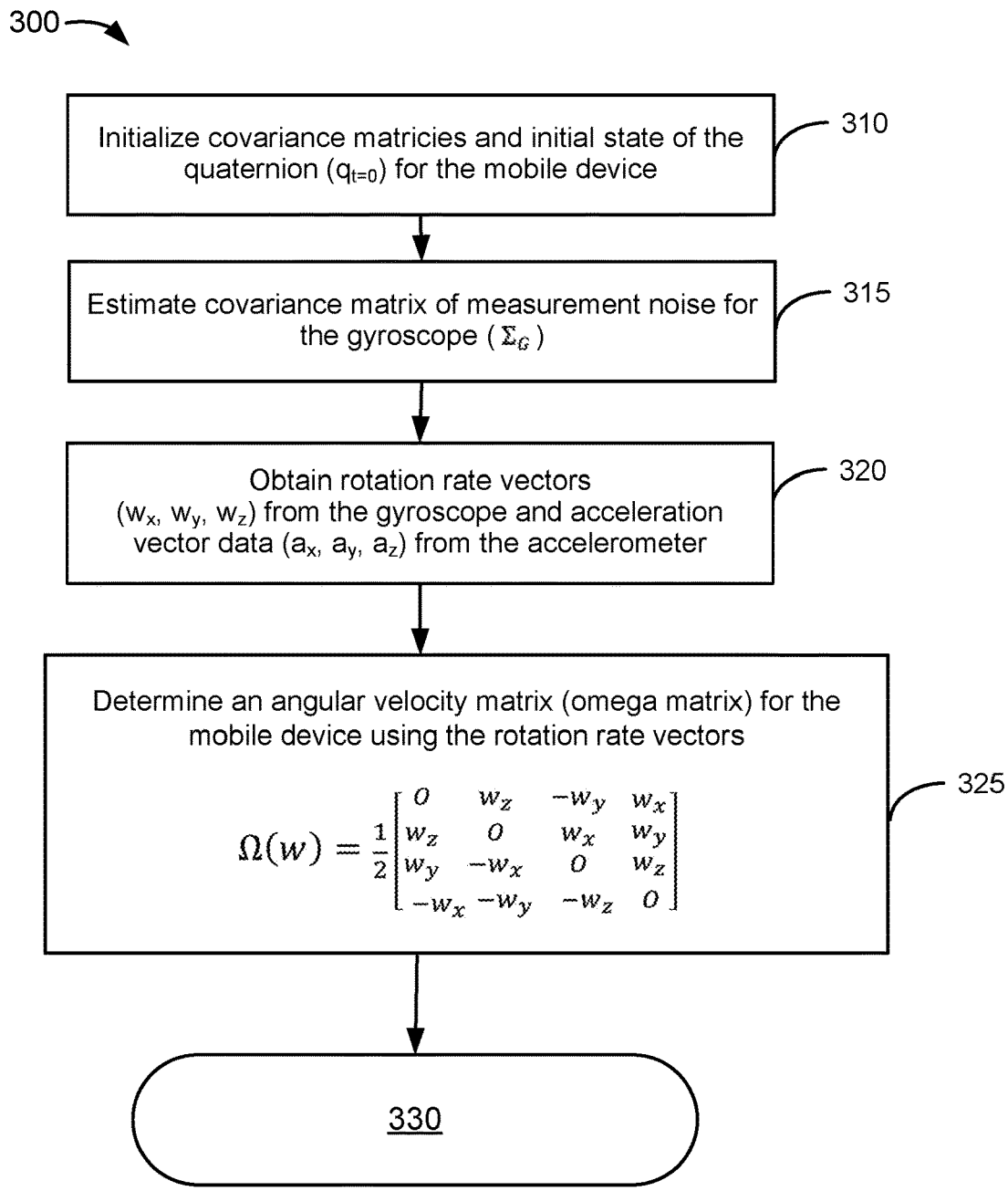
Figure 3C:
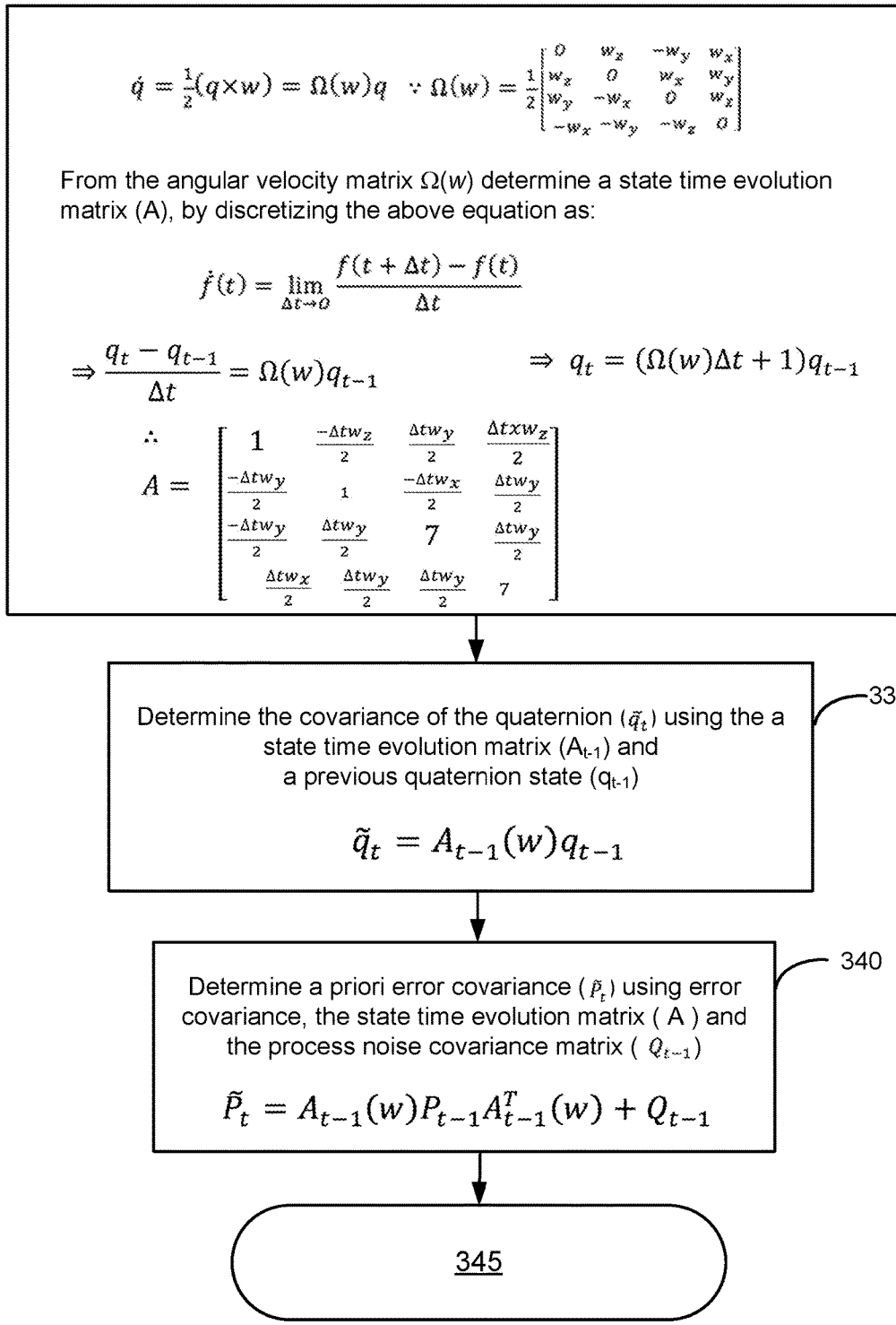
Figure 3D:
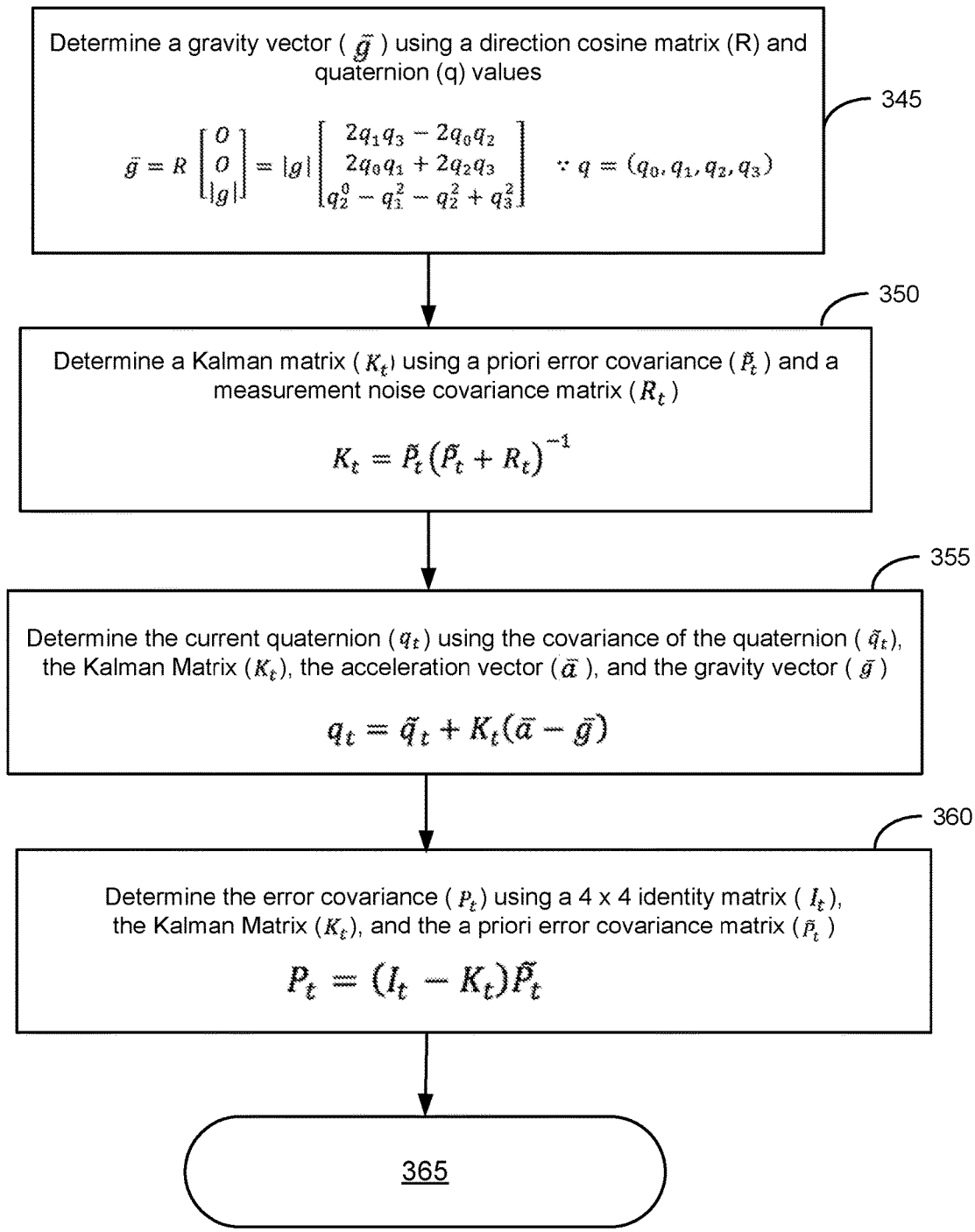
Figure 3E:
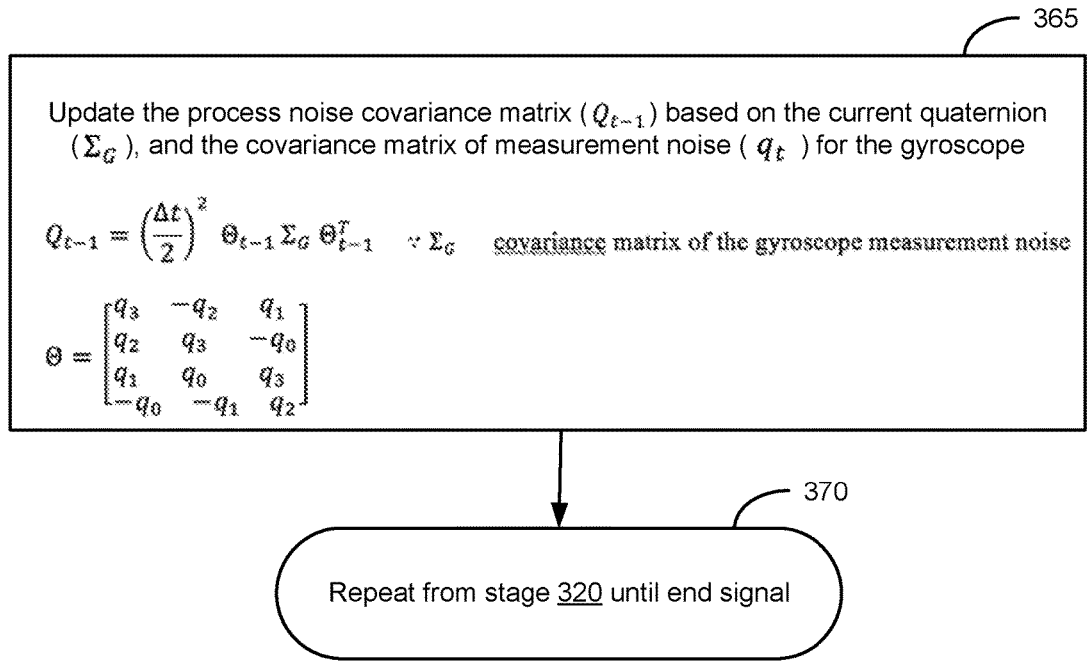

FIGS. 3A-3E are a simplified flowchart illustrating a method 300 of using a variation of an extended Kalman filter to determine a gravity vector for the mobile device using movement data from mobile device sensors. One having skill in the relevant art(s), given the description herein, will appreciate how to use other variations of a Kalman filter and/or other approaches to determine gravity vectors by embodiments described herein. FIG. 3A lists variables used in the method flowchart of FIGS. 3B-3E. It should be understood that other terms can be used for the variables discussed, and additional or fewer variables may be used by some embodiments.

The method illustrated in FIGS. 3A-3E initially initializes values that may be used in later stages of the method. For example, some embodiments of the method utilize covariance matrices and a quaternion value that are initialized (310) and used in a first instance of the method, then updated based on determined results. One having skill in the relevant art(s), given the description herein, would appreciate that the initial values can be selected using different approaches. In one embodiment, the quaternion value is initialized randomly with a value between 0 and 1. Also, in some embodiments, an estimated covariance matrix of measurement noise for the gyroscope (315) can be defined, this matrix remaining static for the operation of the method. This estimate can be determined by empirical testing, e.g., assessing measurement noise for individual devices, a model of device, or any other similar approach.

Next, rotation rate vectors are obtained from the gyroscope and acceleration vector data are obtained from the accelerometer (320). From this data, an angular velocity matrix is determined for the mobile device (325), and this is used along with quaternion, rotation rate and acceleration vector data to determine a state time evolution matrix (330). This state time evolution matrix can be used to determine the covariance of the quaternion using the previous quaternion value for the mobile device (335). An a priori error covariance is determined using an error covariance, the state time evolution matrix and a process noise covariance matrix (340). As noted above, these covariance matrices may have been initialized for the first instance of these determinations.

Using the current quaternion value, a gravity vector is determined using a cosine matrix (345), the quaternion value, in some embodiments, first having an initial value, then having a value updated for each instance of the method. Next a modified extended Kalman matrix is determined using the a priori error covariance and a measurement noise covariance matrix (350). Next, the quaternion for the mobile device is updated based on the covariance of the quaternion, the Kalman matrix, acceleration vector data and the determined gravity vector (355). The error covariance matrix is updated using an identity matrix (e.g., a 4×4 matrix), the Kalman matrix and the a priori error covariance matrix (360).

Finally, the process noise covariance matrix is updated based on the current quaternion and the covariance matrix of measurement noise for the gyroscope (365). As discussed with FIG. 4 below, some embodiments analyze a series of determined gravity vectors, as generated by 345, and the method described above repeats from stage 320 until an end signal is received (370), using the updated values described above. It should be appreciated that, in some embodiments, method 300 is performed on previously collected movement measurement data (e.g., from the accelerometer and gyroscope of the mobile device), and an end signal is received when all of the data has been processed (e.g., at the end of a drive). As would be appreciated by one having skill in the relevant art(s), given the description herein, method 300 can also be performed on movement measurement data as it is collected, and/or a combination of both approaches.

It should be appreciated that the specific steps illustrated in FIGS. 3A-3E provide a particular method of determining gravity vectors using movement data according to an embodiment of the present invention. Other sequences of steps may also be performed according to alternative embodiments. For example, alternative embodiments of the present invention may perform the steps outlined above in a different order. Moreover, the individual steps illustrated in FIGS. 3A-3E may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
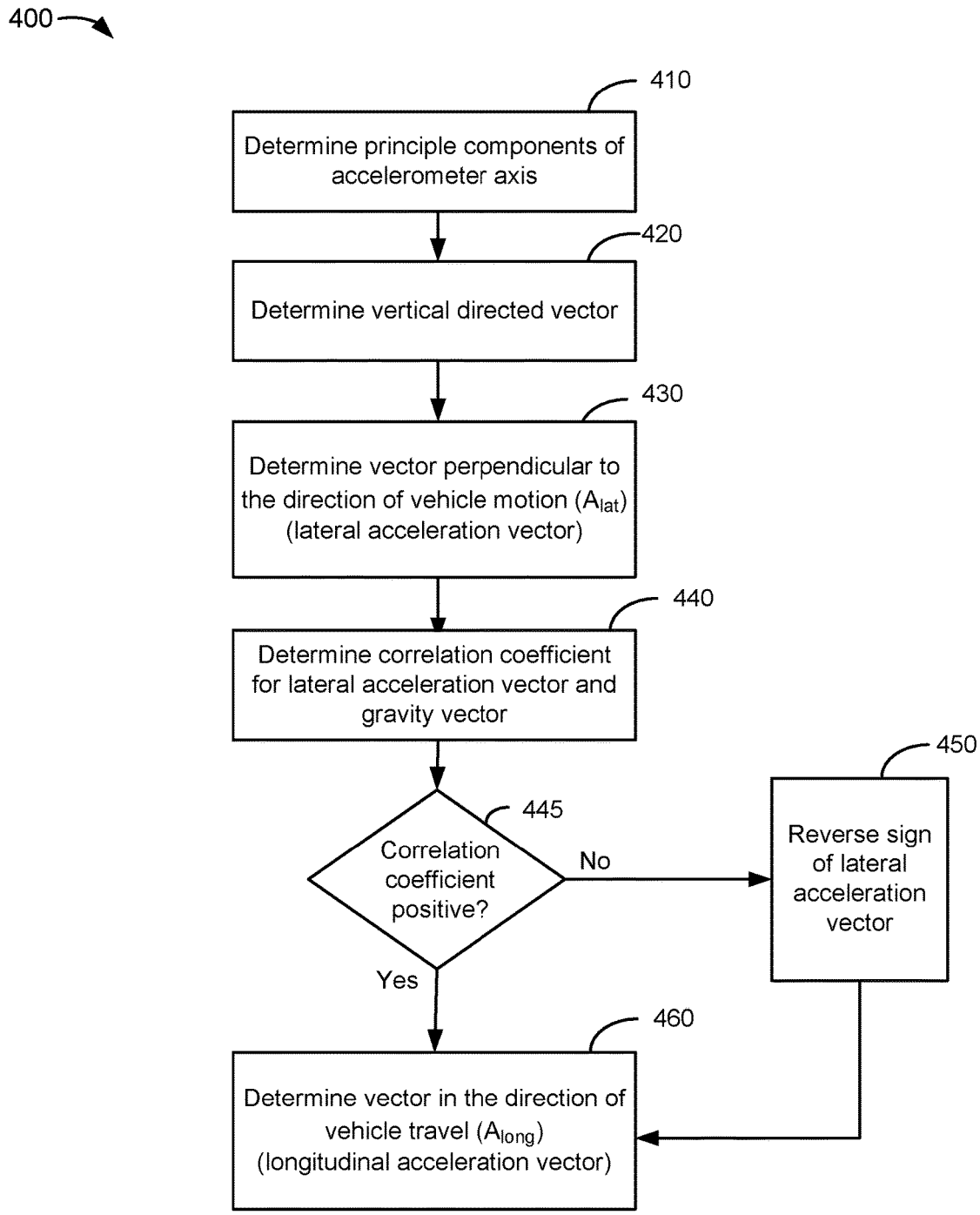
FIG. 4 is a simplified flowchart illustrating a method of classifying the acceleration components of movement measurements according to an embodiment of the present invention.

FIG. 4 shows a simplified flowchart illustrating a method 400 of classifying the acceleration components of movement measurements according to another embodiment of the present invention. The method illustrated in FIG. 4 initially receives the remaining movement measurements from the process described with FIG. 2, i.e., a plurality of movement measurements collected from a mobile device that was estimated to be stationary relative to a vehicle when the measurements were collected. In some embodiments, the process described with FIG. 4 can analyze these collected samples, and determine a measurement for acceleration in the direction that the vehicle is traveling. One having skill in the relevant art(s), given the description herein, will appreciate that the approaches described with FIG. 4 can also be used to determine other measurements.

Having received the movement measurements from the processes of FIG. 2, principle component analysis (PCA) is used to identify three different components of the movement measurements collected the accelerometer for a time interval (410). These components are: acceleration in the direction of travel of the vehicle ($A_{long}$, longitudinal or horizontal acceleration), acceleration perpendicular to the direction of travel of the vehicle ($A_{lat}$, turning, lateral or transversal acceleration), and the "up and down" acceleration ($A_{vert}$, vertical acceleration or the "vertical directed vector"). Three component values are identified at this stage, but the specific components (i.e., $A_{long}$, $A_{lat}$, or $A_{vert}$) are not known. One approach used by some embodiments to identify the three unknown values of the components of the movement measurements is described with FIG. 5 below.

In some embodiments, the vertical directed vector is identified 420 from the three component values by selecting the component that is most highly correlated with (i.e., most similar to) the acceleration projected along the direction of the gravity vector for the time interval. This gravity vector can be determined based on the method described above with FIG. 3.

Next, the lateral acceleration is selected from the two remaining unknown components by identifying the component value that is most highly correlated with (i.e., most similar to) the rotation rate (e.g., measured by the gyroscope) projected along the gravity vector (430). After this component is selected, a correlation coefficient for the lateral acceleration component as compared to the gravity vector is determined (440). In an embodiment, the sign of the determined coefficient is checked (445), and when the sign is negative, the sign of the lateral acceleration component is reversed (450), and when positive, the sign remains the same.

Figure 6A:
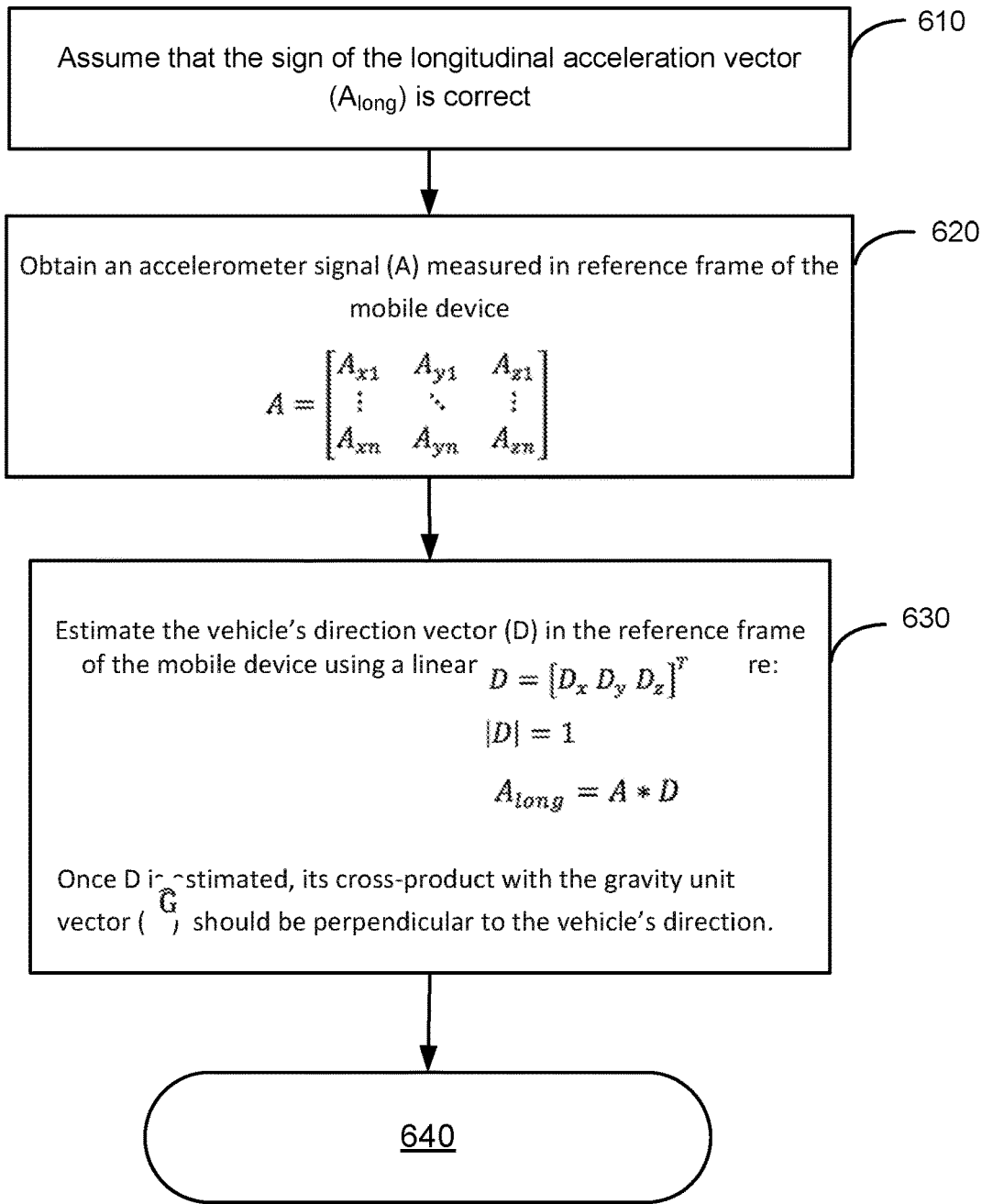
FIGS. 6A-6B is a simplified flowchart illustrating a method of determining the sign of the longitudinal acceleration component according to an embodiment of the present invention.
Figure 6B:
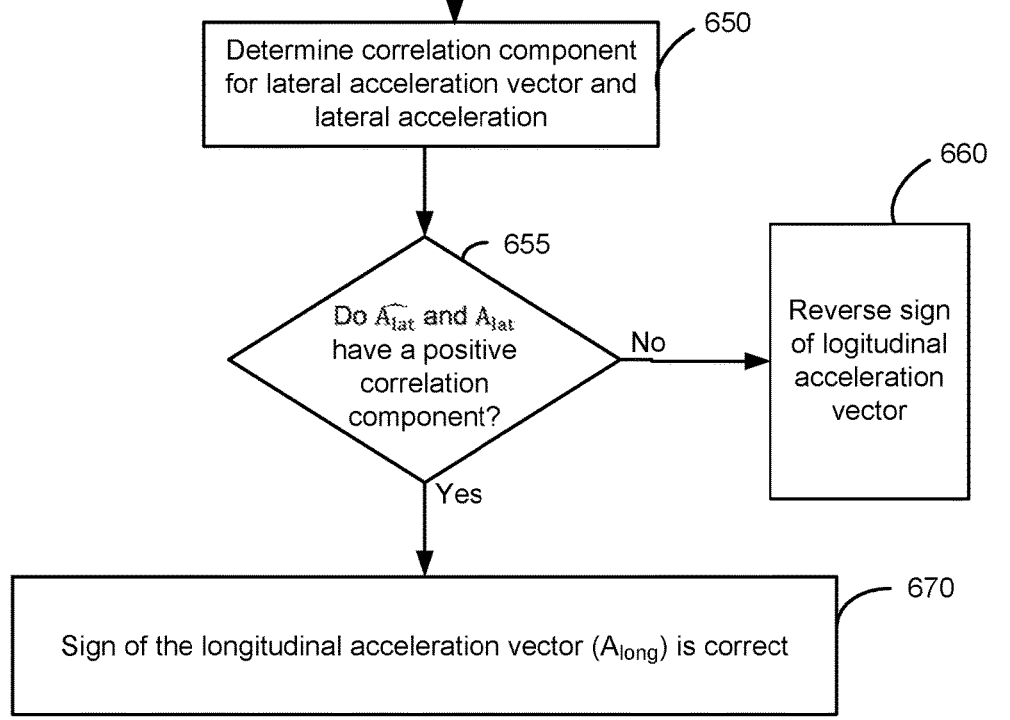

The remaining component is identified as the longitudinal acceleration component (460). In some embodiments, the process described with FIGS. 6A-6B is used to determine the sign of this component.

It should be appreciated that the specific steps illustrated in FIG. 4 provide a particular method of determining the acceleration components of movement measurements according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
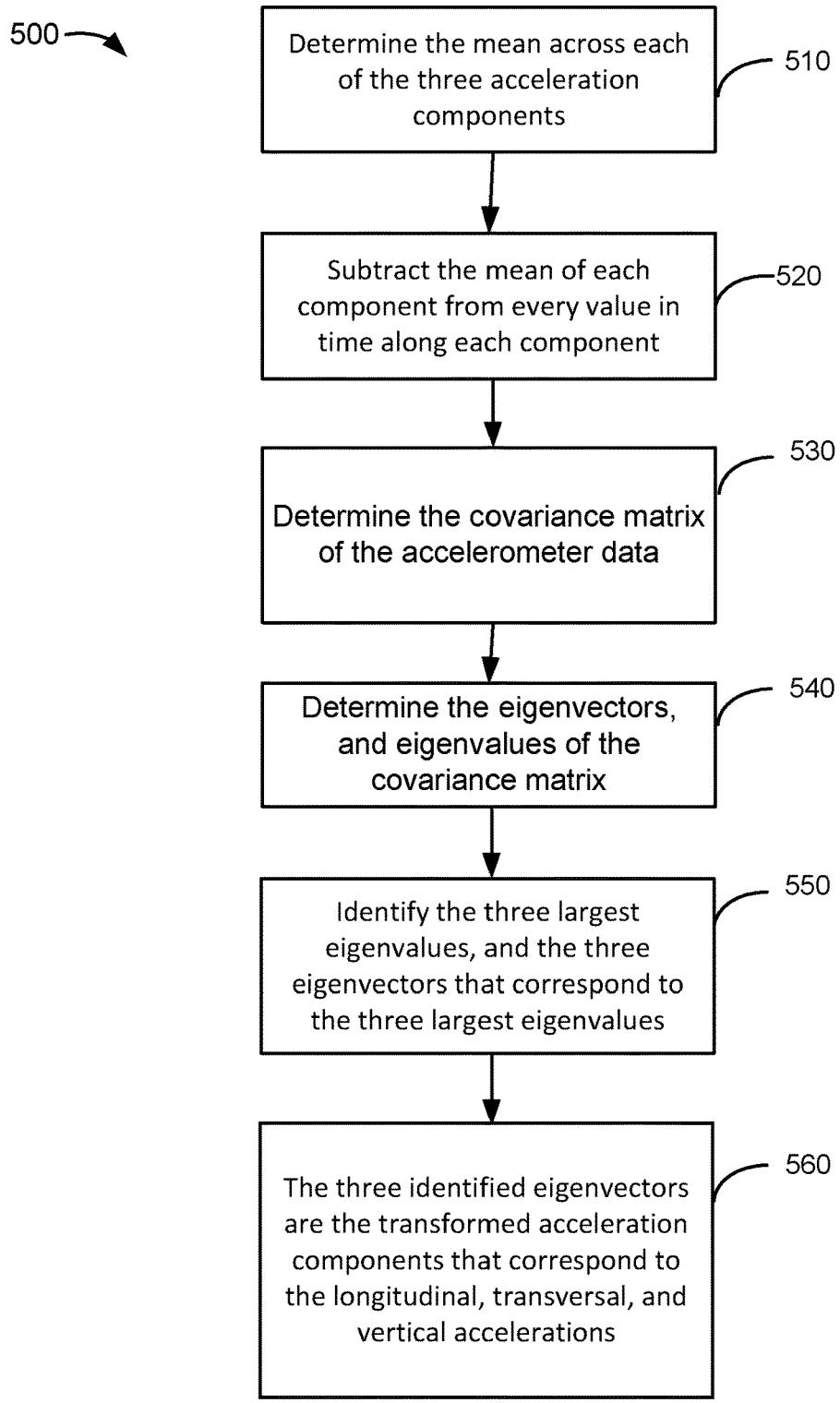
FIG. 5 is a simplified flowchart illustrating a method of using principle component analysis (PCA) to identify different component values of the movement measurements collected according to an embodiment of the present invention.

FIG. 5 is a simplified flowchart illustrating an approach used by some embodiments, to identify by PCA, the three different components of the movement measurements collected by the accelerometer for a time interval. The method of FIG. 5 may be used to implement step 410 of FIG. 4, for example. The mean across each of the three acceleration components is determined (510), and the mean of each component is subtracted from every value in time along each component (520).

Next, a covariance matrix of the accelerometer data is determined (530) using the subtracted values, along with the eigenvectors, and the eigenvalues of the covariance matrix (540). In an example embodiment, the accelerometer data is three-dimensional, and the covariance matrix is a 3×3 matrix. The three largest eigenvalues are identified (540), as well as the three eigenvectors that correspond to the three largest eigenvalues (550). The three identified eigenvectors are the transformed acceleration components that correspond to the longitudinal, transversal, and vertical accelerations (560).

It should be appreciated that the specific steps illustrated in FIG. 5 provide a particular method of using PCA to identify different components of collected movement measurements according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

FIGS. 6A and 6B show a simplified flowchart illustrating a method of determining the sign of the longitudinal acceleration component according to an embodiment of the present invention. The method illustrated in FIGS. 6A-6B begins with an assumption that the sign of the longitudinal component as determined, for example, in the process described with FIG. 5, is correct (610). Next, an accelerometer signal is obtained as measured in the mobile device (620). Using this accelerometer signal and the assumed longitudinal acceleration value, the direction vector of the movement of the vehicle in the reference frame of the mobile device is determined (630).

Next, a lateral acceleration vector is estimated by calculating the cross product of the vehicle's direction vector with the gravity unit vector, and taking the dot product of the resulting vector and the acceleration signal (640). This estimated lateral acceleration vector is correlated with the lateral acceleration component determined with the process described with FIG. 5 (650). If this correlation is negative, the sign of the longitudinal acceleration vector is reversed (660), and if the correlation is positive, the current sign is correct (670). In other words, because the sign of the longitudinal acceleration vector is assumed to be correct at step 610, the correlation of the estimated lateral acceleration vector to the lateral acceleration component may determine whether that assumption is correct.

It should be appreciated that the specific steps illustrated in FIGS. 6A-6B provide a particular method of determining the sign of the longitudinal acceleration component according to an embodiment of the present invention. Other sequences of steps may also be performed according to alternative embodiments. For example, alternative embodiments of the present invention may perform the steps outlined above in a different order. Moreover, the individual steps illustrated in FIGS. 6A-6B may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
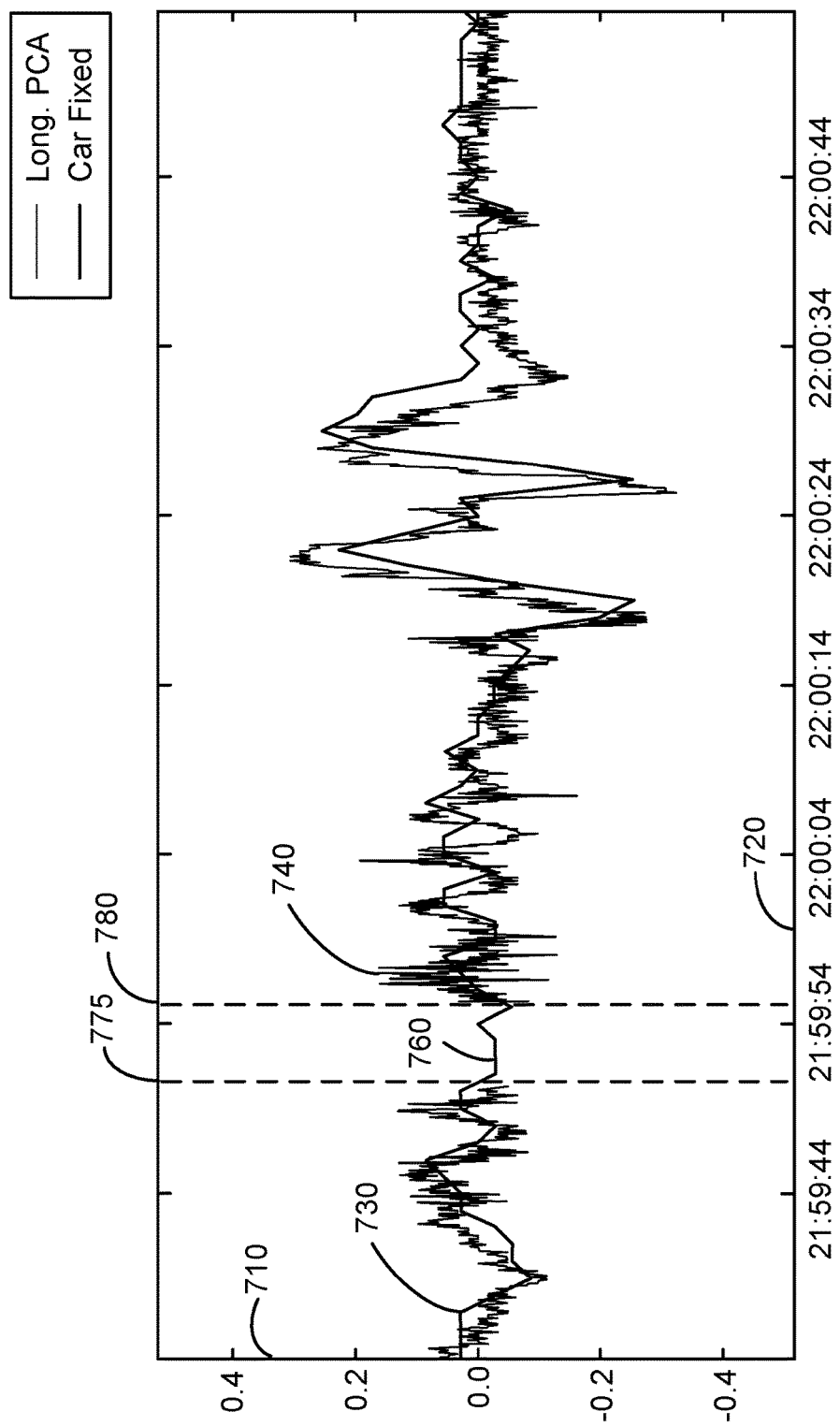
FIG. 7 is a simplified plot illustrating vehicle acceleration measured by an embodiment herein, as compared to acceleration measured by a derivative of the on-board diagnostics (OBD) speed measurements.

FIG. 7 is a simplified plot illustrating vehicle acceleration measured by a mobile device using an embodiment of the movement-detection approaches described herein (740), as compared to acceleration measured by a derivative of the OBD speed measurements (730). The OBD speed derivative (730) is not subject to the movement effects described as affecting the mobile device, e.g., moving in relation to the vehicle. The value of acceleration (710) is shown on the Y-Axis and time (720) is shown on the X-Axis.

As shown on FIG. 7, the interval marked between 775 and 780 is a period of time where the mobile device was determined by an embodiment to have been moved in relation to the vehicle. It should be noted that, for other intervals shown, there is a rough correlation between OBD (730) and acceleration determined by an embodiment (740). During these intervals, while the mobile device is not moving in relation to the vehicle, the acceleration measurements of OBD 740 and mobile device measurements 730 are generally the same.

During the interval between 775 and 780, only the OBD measurements 760 are shown. In this example, because the mobile device was determined to have been moved during this interval, the mobile device measurements 740 were removed from the data set, and not analyzed for indications of driving behavior. If these values had been left in the data set, the acceleration measurements could be substantially different, and, if used to determine vehicle acceleration, these deviations could cause errors in the determined values. In some embodiments, an approach can be used to estimate values for the data omitted during the time period from 775 to 780.

It is important to note that, at time point 780, when the mobile device was determined to have stopped moving in relation to the vehicle, the mobile device need not have been replaced to the same location and/or orientation within the vehicle. Some embodiments are able to align the mobile device to the vehicle and reflect a new orientation within the vehicle.

It should be appreciated that the specific plot illustrated in FIG. 7 provides a particular example of movement data collected and/or generated by an embodiment as compared to data collected by different approaches. In other embodiments, different approaches can be used to handle the movement of the mobile device during the collection of movement measurements. One of ordinary skill in the art would recognize many variations, modifications, and alternatives.

Figure 8:
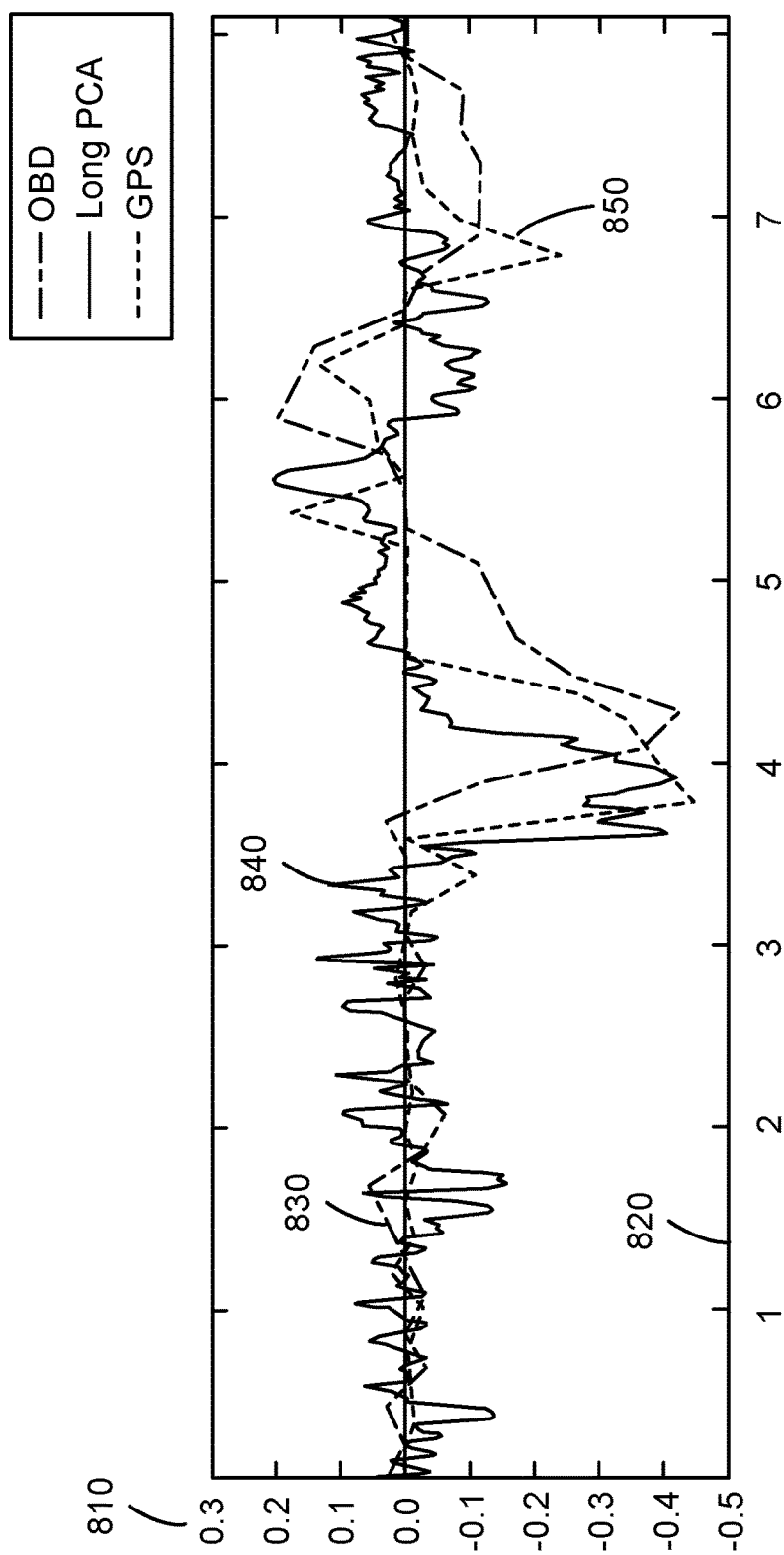
FIG. 8 is a simplified plot illustrating longitudinal vehicle acceleration measured by an embodiment of the present invention as compared to acceleration estimated based on GPS receiver and on-board diagnostics (OBD) measurements.

FIG. 8 is a simplified plot illustrating the longitudinal component of vehicle acceleration determined by an embodiment described herein (840), as compared to longitudinal acceleration measured by a derivative of the OBD speed measurements (830). Also shown on FIG. 8 is longitudinal acceleration measured by a derivative of a GPS speed measurement for the vehicle. The value of acceleration (810) is shown on the Y-Axis and time (820) is shown on the X-Axis.

As noted above with the description of FIG. 4, the longitudinal acceleration, as shown on FIG. 8, is acceleration determined to be in the direction of travel of the vehicle by an embodiment. As would be appreciated by one having skill in the relevant art, given the description herein, the three plotted acceleration values, GPS 850, OBD 830 and longitudinal 840 have similar plotted values.

Figure 9:
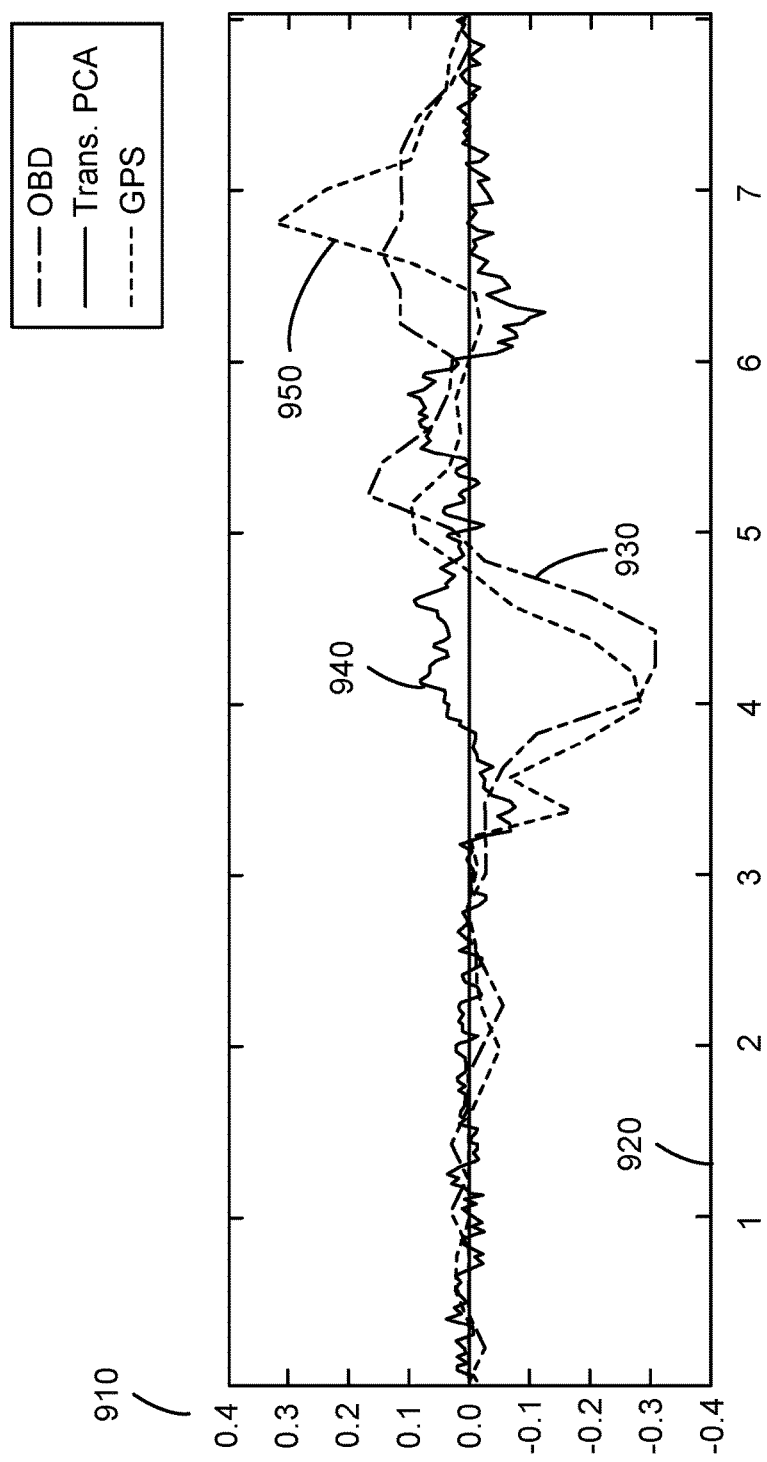
FIG. 9 is a simplified plot illustrating transverse vehicle acceleration measured by an embodiment described herein, as compared to acceleration estimated based on GPS receiver and OBD measurements.

FIG. 9 is a simplified plot illustrating the transverse component of vehicle acceleration determined by an embodiment described herein (940), as compared to transverse acceleration measured by a derivative of the OBD speed measurements (930). Also shown on FIG. 9 is transverse acceleration determined by a derivative of a GPS speed measurement for the vehicle. The value of acceleration (910) is shown on the Y-Axis and time (920) is shown on the X-Axis.

As noted above with the description of FIG. 4, the transverse acceleration, as shown on FIG. 9, is acceleration determined to be in the direction lateral to the direction of travel of the vehicle by an embodiment. As would be appreciated by one having skill in the relevant art, given the description herein, the three plotted acceleration values, GPS 950, OBD 930 and longitudinal 940 have similar plotted values.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A system comprising:
  a mobile device comprising a plurality of sensors including an accelerometer;
  a memory; and
  a processor coupled to the memory, wherein the processor is configured to perform operations including:
    obtaining a plurality of movement measurements over a plurality of time periods from the mobile device in a vehicle;
    extracting a first subset of movement measurements from the plurality of movement measurements corresponding to a first time period of the plurality of time periods;
    determining a first gravity vector associated with the first time period using at least two movement measurements of the first subset of movement measurements;
    extracting a second subset of movement measurements from the plurality of movement measurements corresponding to a second time period of the plurality of time periods;
    determining a second gravity vector associated with the second time period using at least two movement measurements of the second subset of movement measurements;
    determining a gravity angle difference or a gravity magnitude difference between the first gravity vector and the second gravity vector;
    determining that the gravity angle difference is above a first threshold or that the gravity magnitude difference is above a second threshold;
    classifying the first subset of movement measurements and the second subset of movement measurements as movements of the mobile device with respect to the vehicle;
    removing the first subset of movement measurements for the first time period and the second subset of movement measurements for the second time period from the plurality of movement measurements to produce remaining movement measurements over remaining time periods; and
    determining at least one acceleration measurement for the vehicle using the remaining movement measurements over the remaining time periods.

2. The system of claim 1, wherein at least one of the plurality of movement measurements is obtained using the accelerometer of the mobile device.

3. The system of claim 1, wherein the plurality of sensors further comprises a gyroscope, and wherein at least one of the plurality of movement measurements is obtained using the gyroscope of the mobile device.

4. The system of claim 1, wherein at least one of the first gravity vector and the second gravity vector are determined using a quaternion value.

5. The system of claim 4, wherein the quaternion value is calculated using a Kalman matrix.

6. The system of claim 1, wherein the operations further include:
  determining a third gravity vector using the remaining movement measurements;
  separating the at least one acceleration measurement into first, second and third components;
  identifying the first component as a vertical acceleration component, wherein the first component is more highly correlated with acceleration projected onto the third gravity vector than the second component or the third component;
  identifying the second component as a lateral acceleration component, wherein the second component is more highly correlated with a rotation rate around the third gravity vector than the third component; and
  identifying the third component as a longitudinal acceleration component.

7. The system of claim 6, wherein the at least one acceleration measurement is separated into first, second and third components by applying principle component analysis.

8. The system of claim 6, wherein the operations further include:
  determining a correlation coefficient for the lateral acceleration component as compared to the third gravity vector;
  determining that a sign of the correlation coefficient is negative; and
  reversing the sign of the lateral acceleration component.

9. The system of claim 1, wherein the at least one acceleration measurement comprises a first acceleration measurement for a first subset of the remaining time periods and a second acceleration measurement for a second subset of the remaining time periods, and wherein the operations further include:
  separating the first acceleration measurement into first, second and third components;
  separating the second acceleration measurement into fourth, fifth and sixth components;
  determining a first mean value for the first component and the fourth component, a second mean value for the second component and the fifth component, and a third mean value for the third component and the sixth component;
  determining a first difference between the first mean value and the first component, a second difference between the first mean value and the fourth component, a third difference between the second mean value and the second component, a fourth difference between the second mean value and the fifth component, a fifth difference between the third mean value and the third component, and a sixth difference between the third mean value and the sixth component;
  determining a covariance matrix using the first difference, the second difference, the third difference, the fourth difference, the fifth difference and the sixth difference;
  determining a plurality of eigenvectors and a plurality of eigenvalues of the covariance matrix;
  selecting a first, second and third eigenvalue based on the largest eigenvalues of the plurality of eigenvalues;
  identifying first, second and third eigenvectors corresponding to the first, second and third eigenvalues; and
  associating the first, second and third eigenvectors with a vertical acceleration component, a lateral acceleration component, or a longitudinal acceleration component.

10. A method for determining vehicle acceleration with a mobile device disposed in a vehicle, the method comprising:
  operating at least one sensor of a plurality of sensors of the mobile device to obtain a plurality of movement measurements over a plurality of time periods;

extracting, via a processor of the mobile device, a first subset of movement measurements from the plurality of movement measurements corresponding to a first time period of the plurality of time periods;

calculating, based on input from the at least one sensor of the mobile device, a first gravity vector associated with the first time period using at least two movement measurements of the first subset of movement measurements;

extracting, via a processor of the mobile device, a second subset of movement measurements from the plurality of movement measurements corresponding to a second time period of the plurality of time periods;

calculating, based on input from the at least one sensor of the mobile device, a second gravity vector associated with the second time period using at least two movement measurements of the second subset of movement measurements;

generating, with a vector analyzer of the mobile device, a gravity angle difference or a gravity magnitude difference between the first gravity vector and the second gravity vector;

determining that the gravity angle difference is above a first threshold or that the gravity magnitude difference is above a second threshold;

classifying, via the processor of the mobile device, the first subset of movement measurements and the second subset of movement measurements as movements of the mobile device with respect to the vehicle, removing the first subset of movement measurements for the first time period and the second subset of movement measurements for the second time period from the plurality of movement measurements of the mobile device to produce remaining movement measurements over remaining time periods; and determining at least one acceleration measurement for the vehicle using the remaining movement measurements of the mobile device over the remaining time periods.

11. The method of claim 10, wherein at least one of the plurality of movement measurements is obtained using an accelerometer of the mobile device.

12. The method of claim 10, wherein at least one of the plurality of movement measurements is obtained using a gyroscope of the mobile device.

13. The method of claim 10, wherein at least one of the first gravity vector and the second gravity vector are determined using a quaternion value.

14. The method of claim 13, wherein the quaternion value is calculated using a Kalman matrix.

15. The method of claim 10, further comprising:
determining a third gravity vector using the remaining movement measurements;
separating the at least one acceleration measurement into first, second and third components;
identifying the first component as a vertical acceleration component, wherein the first component is more highly correlated with acceleration projected onto the third gravity vector than the second component or the third component;
identifying the second component as a lateral acceleration component, wherein the second component is more highly correlated with a rotation rate around the third gravity vector than the third component; and
identifying the third component as a longitudinal acceleration component.

16. The method of claim 15, wherein the at least one acceleration measurement is separated into first, second and third components by applying principle component analysis.

17. The method of claim 15, further comprising:
determining a correlation coefficient for the lateral acceleration component as compared to the third gravity vector;
determining that a sign of the correlation coefficient is negative; and
reversing the sign of the lateral acceleration component.

18. The method of claim 10, wherein the at least one acceleration measurement comprises a first acceleration measurement for a first subset of the remaining time periods and a second acceleration measurement for a second subset of the remaining time periods, and wherein the method further comprises:
separating the first acceleration measurement into first, second and third components;
separating the second acceleration measurement into fourth, fifth and sixth components;
determining a first mean value for the first component and the fourth component, a second mean value for the second component and the fifth component, and a third mean value for the third component and the sixth component;
determining a first difference between the first mean value and the first component, a second difference between the first mean value and the fourth component, a third difference between the second mean value and the second component, a fourth difference between the second mean value and the fifth component, a fifth difference between the third mean value and the third component, and a sixth difference between the third mean value and the sixth component;
determining a covariance matrix using the first difference, the second difference, the third difference, the fourth difference, the fifth difference and the sixth difference;
determining a plurality of eigenvectors and a plurality of eigenvalues of the covariance matrix;
selecting a first, second and third eigenvalue based on the largest eigenvalues of the plurality of eigenvalues;
identifying first, second and third eigenvectors corresponding to the first, second and third eigenvalues; and
associating the first, second and third eigenvectors with a vertical acceleration component, a lateral acceleration component, or a longitudinal acceleration component.

* * * * *